(12) United States Patent
Ibe

(10) Patent No.: US 7,367,537 B2
(45) Date of Patent: May 6, 2008

(54) COLOR-IMAGE PICKUP DEVICE IN WHICH AN R PICTURE SIGNAL IS RELATIVELY ENHANCED WITH DISTANCE FROM CENTER OF LIGHT-RECEPTION AREA

(75) Inventor: Hiroshi Ibe, Aasaka (JP)

(73) Assignee: FUJIFILM Corporation, Tokyo (JP)

(*) Notice: Subject to any disclaimer, the term of this patent is extended or adjusted under 35 U.S.C. 154(b) by 755 days.

(21) Appl. No.: 10/807,471

(22) Filed: Mar. 24, 2004

(65) Prior Publication Data

US 2004/0239784 A1  Dec. 2, 2004

(30) Foreign Application Priority Data

Mar. 25, 2003  (JP)  ............... 2003-082848

(51) Int. Cl.
*H04N 9/07*  (2006.01)

(52) U.S. Cl. ............... 248/266; 348/273; 348/335

(58) Field of Classification Search .............. 348/266, 348/273, 335, 342
See application file for complete search history.

(56) References Cited

U.S. PATENT DOCUMENTS

| | | | |
|---|---|---|---|
| 5,406,391 A * | 4/1995 | Takahashi | 358/482 |
| 5,432,550 A * | 7/1995 | Kwon | 348/255 |
| 6,008,511 A * | 12/1999 | Tokumitsu et al. | 257/232 |
| 6,292,212 B1 * | 9/2001 | Zigadlo et al. | 348/33 |
| 6,587,147 B1 * | 7/2003 | Li | 348/340 |
| 6,661,458 B1 * | 12/2003 | Takada et al. | 348/273 |
| 6,667,471 B2 * | 12/2003 | Bos et al. | 250/208.1 |
| 2002/0094131 A1 | 7/2002 | Shirakawa | |

FOREIGN PATENT DOCUMENTS

| | | |
|---|---|---|
| JP | 5-207350 A | 8/1993 |
| JP | 2002-218298 | 8/2002 |

* cited by examiner

*Primary Examiner*—Lin Ye
*Assistant Examiner*—Gevell Selby
(74) *Attorney, Agent, or Firm*—Sughrue Mion, PLLC

(57) ABSTRACT

In a color-image pickup device, light is decomposed by R filters, G filters, B filters, and an infrared blocking film into R, G, and B components, and photoelectric conversion elements arranged in a light-reception area receive the R, G, and B components, and output R, G, and B picture signals. The relative reduction in the intensity of the R picture signal, which increases with the incident angle of the R component, is compensated for by relatively increasing the transmittance of the R component or the gain of the R picture signal, or setting light-reception efficiencies at the respective photoelectric conversion elements so as to relatively increase the light-reception efficiency of the R component, with an increase in the distance from the center of the light-reception area.

13 Claims, 10 Drawing Sheets

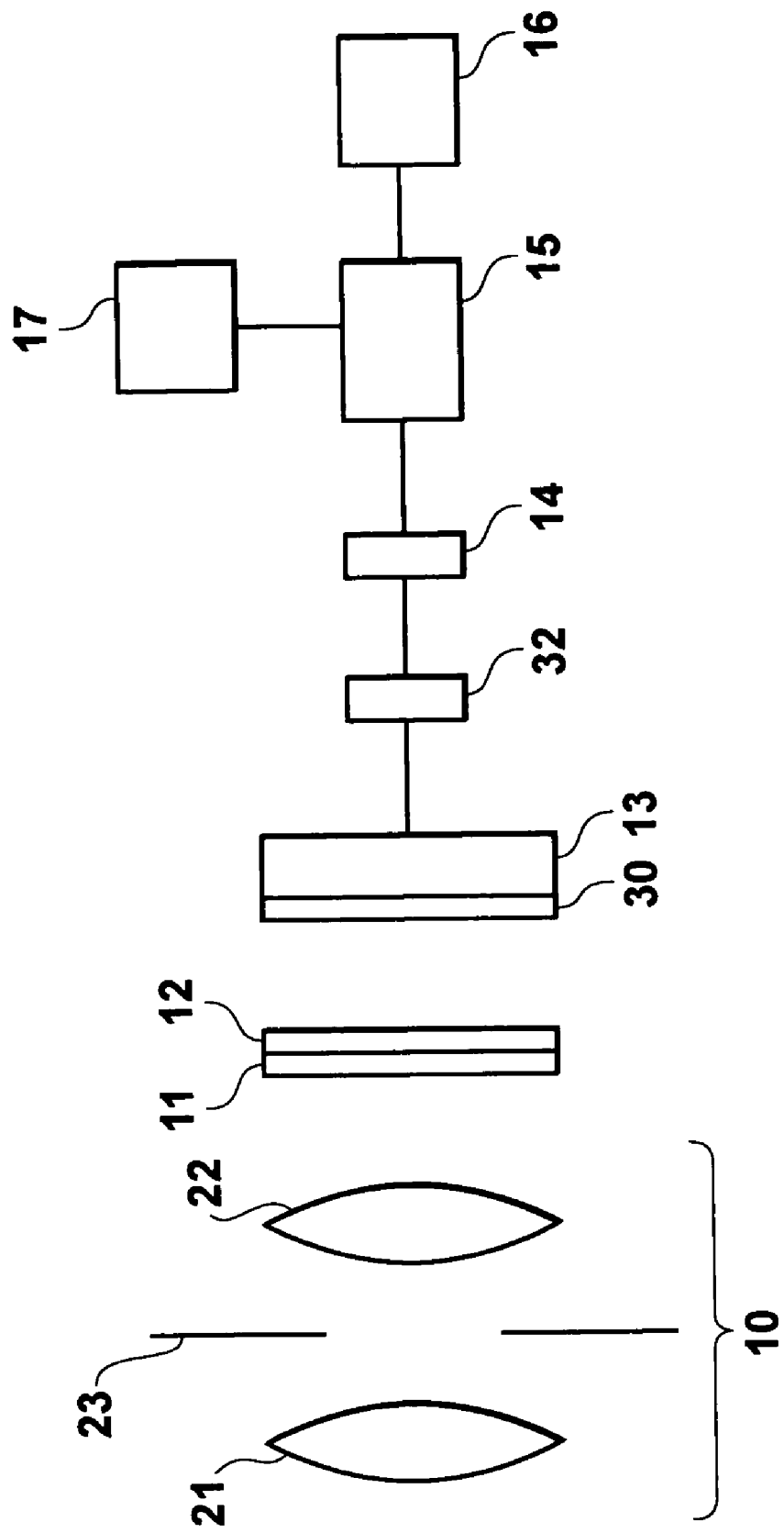

COLOR-IMAGE PICKUP DEVICE IN WHICH AN R PICTURE SIGNAL IS RELATIVELY ENHANCED WITH DISTANCE FROM CENTER OF LIGHT-RECEPTION AREA

BACKGROUND OF THE INVENTION

1. Field of the Invention

The present invention relates to a color-image pickup device which decomposes an optical image of an object with color filters, picks up the optical image with photoelectric conversion elements, and obtains a color-picture signal. In addition, the present invention also relates to an electronic color camera which contains the above color-image pickup device.

2. Description of the Related Art

The following document (1) discloses information related to the present invention.

(1) Japanese Unexamined Patent Publication No. 5-207350

In recent years, video cameras and electronic cameras have come into widespread use. Currently, the technology of advanced color-image pickup devices for use in the video cameras and electronic cameras is rapidly developing. Normally, CCD type or CMOS type image pickup elements are used in the color-image pickup devices. In order to obtain a color-picture signal, the image pickup elements are used in combination with on-chip type or field-sequential type color filters. In the on-chip type color filters, very small color filter elements are used in combination. In the field-sequential type color filters, color filter elements are sequentially arranged in a time-sharing manner. Further, the color filters may be RGB filters, YCyMg filters, or the like. The RGB filters are realized by R filters transmitting light in a red wavelength range, G filters transmitting light in a green wavelength range, and B filters transmitting light in a blue wavelength range. The YCyMg filters are realized by Y filters transmitting light in a yellow (red+green) wavelength range, Cy filters transmitting light in a cyan (green+blue) wavelength range, and Mg filters transmitting light in a magenta (red+blue) wavelength range.

Although it is often explained that the color filters are constituted by a plurality of optical filters each transmitting light in a predetermined wavelength range as indicated above, the color filters actually have a different structure. For example, since the image pickup devices such as CCDs have substantial sensitivity to infrared rays, it is necessary to provide an infrared-cutoff filter which cuts off the infrared rays.

Hereinbelow, the detailed structure of an example of an actual color filter will be described. In this example, the color filter is a primary-color filter. FIG. 12 shows transmission wavelength ranges of four optical filters (a B filter, a G filter, an R filter, and an infrared-cutoff filter) used in the primary-color filter. As shown in FIG. 12, the B filter transmits light in the wavelength range from about 400 to 450 nm, and determines a blue wavelength range, the G filter transmits light in the wavelength range from about 500 to 550 nm, and determines a green wavelength range, the R filter transmits light having wavelengths equal to or longer than 600 nm, and determines the lower limit of the red wavelength range, and the infrared-cutoff filter determines the higher limit of the red wavelength range. Since neither the B filter nor the G filter can cut off the infrared rays, in many color filters, the infrared-cutoff filter is superimposed on each of the R, G, and B filters, and normally a discrete infrared-cutoff filter such as a colored glass plate is inserted into the optical system.

Further, with the recent development in the miniaturization of color-image pickup devices, there is great demand for the miniaturization of optical elements. Therefore, currently, the miniaturization of image pickup lens systems is being pursued. In addition, in some proposed devices, as disclosed in the aforementioned document (1), a dielectric multilayer film for infrared blocking is formed by vapor deposition on an optical element such as a lens or cover glass, instead of the insertion of the discrete infrared-cutoff filter.

Increase in the angular aperture on the image side (i.e., increase in the angle between the optical axis and the principal ray corresponding to the maximum image height) is effective to miniaturize the image pickup lens systems. However, when the angular aperture on the image side is great, the light incident angle at each photoelectric conversion element in each image pickup device increases as the distance from the center of the light-reception area of the image pickup device to the photoelectric conversion element increases. On the other hand, as illustrated in FIG. 13, the transmission wavelength range of the dielectric multilayer film for infrared blocking has a dependence on the incident angle, and the red wavelength range moves to the shorter-wavelength side as the incident angle increases. Therefore, the upper-wavelength side of the red wavelength range is cut off, and the width of the red wavelength range is reduced.

Thus, the ratio of the signal intensity in the red wavelength range to the signal intensity in the green or blue wavelength range at each photoelectric conversion element in each image pickup device decreases as the distance from the center of the light-reception area of the image pickup device to the photoelectric conversion element increases. Therefore, colors represented by the color signal obtained from the above image pickup device are different from actual colors, i.e., color shading occurs.

SUMMARY OF THE INVENTION

The present invention has been developed in view of the above circumstances.

The first object of the present invention is to provide a color-image pickup device which uses a dielectric multilayer film for infrared blocking, is miniaturized, and suppresses occurrence of color shading.

The second object of the present invention is to provide an electronic color camera which contains the above color-image pickup device.

(1) According to the first aspect of the present invention, there is provided a color-image pickup device comprising: a color filter unit which includes R filters, G filters, B filters, and an optical element having a dielectric multilayer film for infrared blocking, for decomposing light into a first component in a red wavelength range, a second component in a green wavelength range, and a third component in a blue wavelength range, wherein the R filters determine a lower wavelength limit of the red wavelength range, the G filters determine the green wavelength range, the B filters determine the blue wavelength range, and the dielectric multilayer film determines an upper wavelength limit of the red wavelength range; an image pickup unit which is placed in a stage following the color filter unit, includes a plurality of photoelectric conversion elements being arranged in a light-reception area to receive the first, second, and third components, picks up an optical image from the first, second, and third components received by the plurality of photoelectric conversion elements, and outputs picture signals corresponding to the first, second, and third components; a color-picture-signal generation unit which generates a color-picture signal based on the picture signal outputted from the image pickup unit; and a transmittance distribution means for realizing a spatial distribution of a ratio of a transmittance of the first component received by ones of the plurality of photoelectric conversion elements arranged in each portion of the light-reception area to a transmittance of each of the second and third components received by ones of the plurality of photoelectric conversion elements arranged in the portion of the light-reception area so that the ratio increases with a distance from a center of the light-reception area to the portion of the light-reception area.

In the color-image pickup device according to the first aspect of the present invention, the dielectric multilayer film for infrared blocking is used. In addition, the width of the red wavelength range is reduced as the incident angle of light on the dielectric multilayer film for infrared blocking increases. That is, the widths of the red wavelength ranges of light injected into ones of the plurality of photoelectric conversion elements located farther from the center of the light-reception area are smaller. However, according to the first aspect of the present invention, the influence of the above reduction in the width of the red wavelength range can be compensated for, by increasing the ratio of the transmittance of the first component to the transmittance of each of the second and third components with the distance from the center of the light-reception area to each portion of the light-reception area, in which ones of the plurality of photoelectric conversion elements receive the first, second, and third components. Therefore, it is possible to make the relative signal intensities of the first (red) component, the second (green) component, and the third (blue) component approximately uniform in the entire light-reception area when the entire light-reception area receives light having a uniform color, to substantially eliminate color shading. Thus, occurrence of color shading can be suppressed.

The color-image pickup device according to the first aspect of the present invention may also have one or any possible combination of the following additional features (i) to (viii).

(i) It is preferable that the ratio of the transmittance of the first component to the transmittance of each of the second and third components is increased in such a manner that the relative signal intensities of the first, second, and third components become approximately uniform in the entire light-reception area when the entire light-reception area receives light having a uniform color, to substantially eliminate color shading.

(ii) The ratio of the transmittance of the first component to the transmittance of each of the second and third components may be increased by increasing the transmittance of the first component received by each of the plurality of photoelectric conversion elements with the distance from the center of the light-reception area to the photoelectric conversion element which receives the first component.

In this case, it is possible to reduce the difference in signal intensity between the central area and the vicinities of the perimeter of the light-reception area. Therefore, occurrence of luminance shading can be suppressed as well as the color shading.

(iii) The ratio of the transmittance of the first component to the transmittance of each of the second and third components may be increased by decreasing the transmittance of each of the second and third components received by each of the plurality of photoelectric conversion elements with an increase in the distance from the center of the light-reception area to the photoelectric conversion element which receives each of the second and third components.

(iv) Each of the R filters may have a transmittance which increases with the distance from the center of the light-reception area to the R filter so that the R filters realize the transmittance distribution means. In this case, it is unnecessary to arrange the transmittance distribution means as a separate element. Therefore, it is possible to prevent an increase in device size.

(v) It is possible to provide a filter separately from the R filters, and arrange transmittances of respective portions of the separately provided filter so that the separately provided filter realizes the transmittance distribution means.

(vi) In the case where a plurality of microlenses are arranged for respectively forming images in the plurality of photoelectric conversion elements, it is possible to arrange the transmittances of the respective microlenses so that the microlenses realize the transmittance distribution means.

(vii) In the case where an on-chip element having color filters, microlenses, or the like is attached to the photoelectric conversion elements through a flattened film formed between the on-chip element and the photoelectric conversion elements, it is possible to arrange transmittances of respective portions of the flattened film so that the flattened film realizes the transmittance distribution means.

(viii) The color filter unit may include Y filter, Cy filters, and Mg filters, instead of R filters, G filters, B filters.

(2) According to the second aspect of the present invention, there is provided a color-image pickup device comprising: a color filter unit which includes R filters, G filters, B filters, and an optical element having a dielectric multilayer film for infrared blocking, for decomposing light into a first component in a red wavelength range, a second component in a green wavelength range, and a third component in a blue wavelength range, wherein the R filters determine a lower wavelength limit of the red wavelength range, the G filters determine the green wavelength range, the B filters determine the blue wavelength range, and the dielectric multilayer film determines an upper wavelength limit of the red wavelength range; an image pickup unit which is placed in a stage following the color filter unit, includes a plurality of photoelectric conversion elements being arranged in a light-reception area to receive the first, second, and third components, picks up an optical image from the first, second, and third components received by the plurality of photoelectric conversion elements, and outputs a first picture signal corresponding to the first component, a second picture signal corresponding to the second component, and a third picture signal corresponding to the third component; an amplifier which separately amplifies the first, second, and third picture signals in such a manner that a ratio of a first gain of the first picture signal corresponding to the first component received by ones of the plurality of photoelectric conversion elements arranged in each portion of the light-reception area to each of second and third gains of the second and third picture signals corresponding to the second and third components received by ones of the plurality of photoelectric conversion elements arranged in the portion of the light-reception area increases with a distance from a center of the light-reception area to the portion of the light-reception area; and a color-picture-signal generation unit which generates a color-picture signal based on the first, second, and third picture signals amplified by the amplifier.

In the color-image pickup device according to the second aspect of the present invention, the dielectric multilayer film for infrared blocking is used. In addition, the width of the red wavelength range is reduced as the incident angle of light on the dielectric multilayer film for infrared blocking increases. That is, the widths of the red wavelength ranges of light injected into ones of the plurality of photoelectric conversion elements located farther from the center of the light-reception area are smaller. However, according to the second aspect of the present invention, the influence of the above reduction in the width of the red wavelength range can be compensated for by increasing the ratio of the first gain of first picture signal corresponding to the first component to each of the second and third gains of the second and third picture signals corresponding to the second and third components with the distance from the center of the light-reception area to photoelectric conversion elements receiving the first, second, and third components. Therefore, it is possible to make the relative signal intensities of the first (red) component, the second (green) component, and the third (blue) component approximately uniform in the entire light-reception area when the entire light-reception area receives light having a uniform color. Thus, occurrence of color shading can be suppressed.

The color-image pickup device according to the second aspect of the present invention may also have one or any possible combination of the following additional features (ix) and (x) and the aforementioned additional feature (viii).

(ix) It is preferable that the ratio of the first gain of the first component to each of the second and third gains of the second and third picture signals is increased in such a manner that the relative signal intensities of the first, second, and third components become approximately uniform in the entire light-reception area when the entire light-reception area receives light having a uniform color, to substantially eliminate color shading.

(x) The ratio of the first gain of the first component to each of the second and third gains of the second and third picture signals may be increased by increasing the first gain of the first picture signal corresponding to the first component received by each of the plurality of photoelectric conversion elements with the distance from the center of the light-reception area to the photoelectric conversion element which receives the first component.

In this case, it is possible to reduce the difference in signal intensity between the central area and the vicinities of the perimeter of the light-reception area. Therefore, occurrence of luminance shading can be suppressed as well as the color shading.

(3) According to the third aspect of the present invention, there is provided a color-image pickup device comprising: a color filter unit which includes R filters, G filters, B filters, and an optical element having a dielectric multilayer film for infrared blocking, for decomposing light into a first component in a red wavelength range, a second component in a green wavelength range, and a third component in a blue wavelength range, where the R filters determine a lower wavelength limit of the red wavelength range, the G filters determine the green wavelength range, the B filters determine the blue wavelength range, and the dielectric multilayer film determines an upper wavelength limit of the red wavelength range; an image pickup unit which is placed in a stage following the color filter unit, includes a plurality of microlenses and a plurality of photoelectric conversion elements being arranged in a light-reception area to receive the first, second, and third components through the plurality of microlenses, picks up an optical image from the first, second, and third components received by the plurality of photoelectric conversion elements, and outputs picture signals corresponding to the first, second, and third components; and a color-picture-signal generation unit which generates a color-picture signal based on the first, second, and third picture signals outputted from the image pickup unit. In this color-image pickup device, relative positions between each of the plurality of photoelectric conversion elements and one of the plurality of microlenses corresponding to the photoelectric conversion element are set in such a manner that a ratio of light-reception efficiency of the first component received by ones of the plurality of photoelectric conversion elements arranged in each portion of the light-reception area to light-reception efficiency of the second and third components received by ones of the plurality of photoelectric conversion elements arranged in the portion of the light-reception area increases with a distance from a center of the light-reception area to the portion of the light-reception area.

In the color-image pickup device according to the third aspect of the present invention, the dielectric multilayer film for infrared blocking is used. In addition, the width of the red wavelength range is reduced as the incident angle of light on the dielectric multilayer film for infrared blocking increases. That is, the widths of the red wavelength ranges of light injected into ones of the plurality of photoelectric conversion elements located farther from the center of the light-reception area are smaller. However, according to the third aspect of the present invention, the influence of the above reduction in the width of the red wavelength range can be compensated for by setting the relative positions between each of the plurality of photoelectric conversion elements and one of the plurality of microlenses corresponding to the photoelectric conversion element in such a manner that the ratio of the light-reception efficiency of the first component received by ones of the plurality of photoelectric conversion elements arranged in each portion of the light-reception area to the light-reception efficiency of the second and third components received by ones of the plurality of photoelectric conversion elements arranged in the portion of the light-reception area is increased with the distance from the center of the light-reception area to the above portion of the light-reception area. Therefore, it is possible to make the relative signal intensities of the first (red) component, the second (green) component, and the third (blue) component approximately uniform in the entire light-reception area when the entire light-reception area receives light having a uniform color. Thus, occurrence of color shading can be suppressed.

The color-image pickup device according to the third aspect of the present invention may also have one of or a combination of the following additional feature (xi) and the aforementioned additional feature (viii).

(xi) It is preferable that the ratio of the first light-reception efficiency to the second light-reception efficiency is increased in such a manner that the relative signal intensities of the first, second, and third components become approximately uniform in the entire light-reception area when the entire light-reception area receives light having a uniform color, to substantially eliminate color shading.

(4) According to the fourth aspect of the present invention, there is provided an electronic color camera comprising the color-image pickup device according to the first aspect of the present invention and an image-forming optical system optically coupled to the color-image pickup device.

According to the fifth aspect of the present invention, there is provided an electronic color camera comprising the color-image pickup device according to the second aspect of the present invention and an image-forming optical system optically coupled to the color-image pickup device.

According to the sixth aspect of the present invention, there is provided an electronic color camera comprising the color-image pickup device according to the third aspect of the present invention and an image-forming optical system optically coupled to the color-image pickup device.

The electronic color cameras according to the fourth to sixth aspects of the present invention may also have one or any possible combination of the aforementioned additional features (i) to (xi).

BRIEF DESCRIPTION OF THE DRAWINGS

FIG. 6 is a diagram schematically illustrating an outline of a construction of an electronic color camera according to a second embodiment of the present invention.

DESCRIPTION OF PREFERRED EMBODIMENTS

Embodiments of the present invention will be described in detail below with reference to the attached drawings.

First Embodiment

Figure 1:
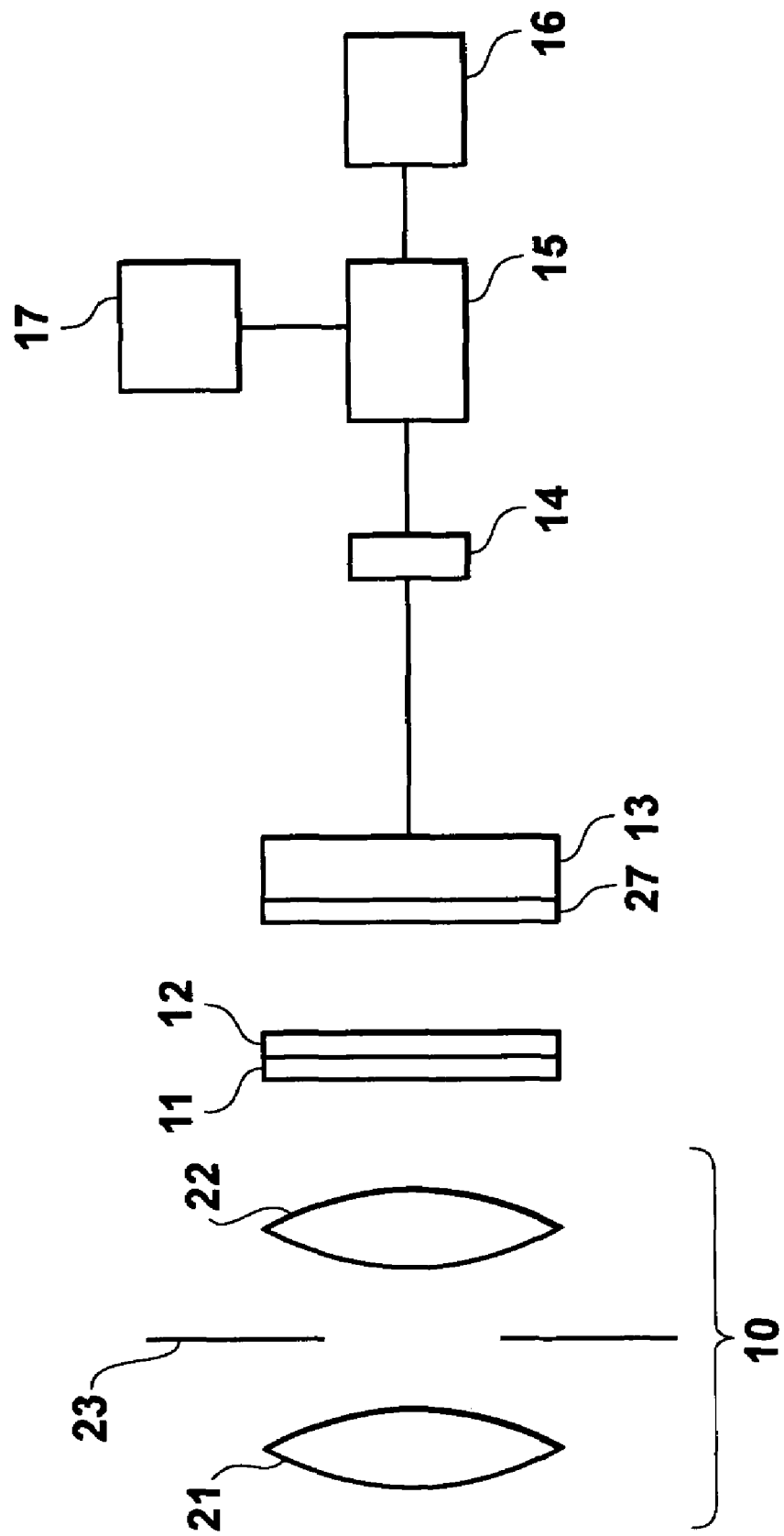
FIG. 1 is a diagram schematically illustrating an outline of a construction of an electronic color camera according to a first embodiment of the present invention.
Figure 13:
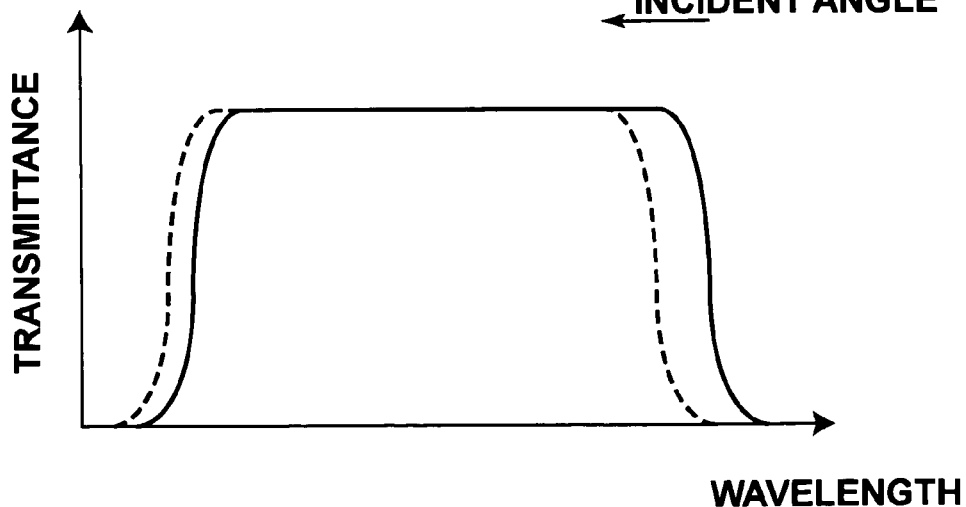
FIG. 13 is a graph indicating the transmission wavelength range of the dielectric multilayer film for infrared blocking.

FIG. 1 is a diagram schematically illustrating an outline of a construction of an electronic color camera according to the first embodiment of the present invention. The electronic color camera of FIG. 1 comprises an image-forming optical system 10, a glass cover 12 on which a dielectric multilayer film 11 for infrared blocking is formed by vapor deposition, a CCD image-pickup device 13 to which an on-chip type RGB filter 27 is attached, an analog-to-digital (A/D) converter 14 which performs analog-to-digital conversion of picture signals obtained by the CCD image-pickup device 13, a signal processing unit 15 which processes picture signals digitized by the A/D converter 14, a display unit 16 which displays picture signals processed by the signal processing unit 15 in a predetermined manner, and a recording unit 17 which records picture signals processed by the signal processing unit 15 for image compression or the like. As illustrated in FIG. 13, the transmission wavelength range of the dielectric multilayer film 11 for infrared blocking moves to the shorter-wavelength side when the incident angle on the dielectric multilayer film 11 increases.

The image-forming optical system 10 is constituted by a condensing lens 21 and an objective lens 22 which are arranged along an optical axis, and a field stop 23 arranged between the condensing lens 21 and the objective lens 22.

Figure 2:
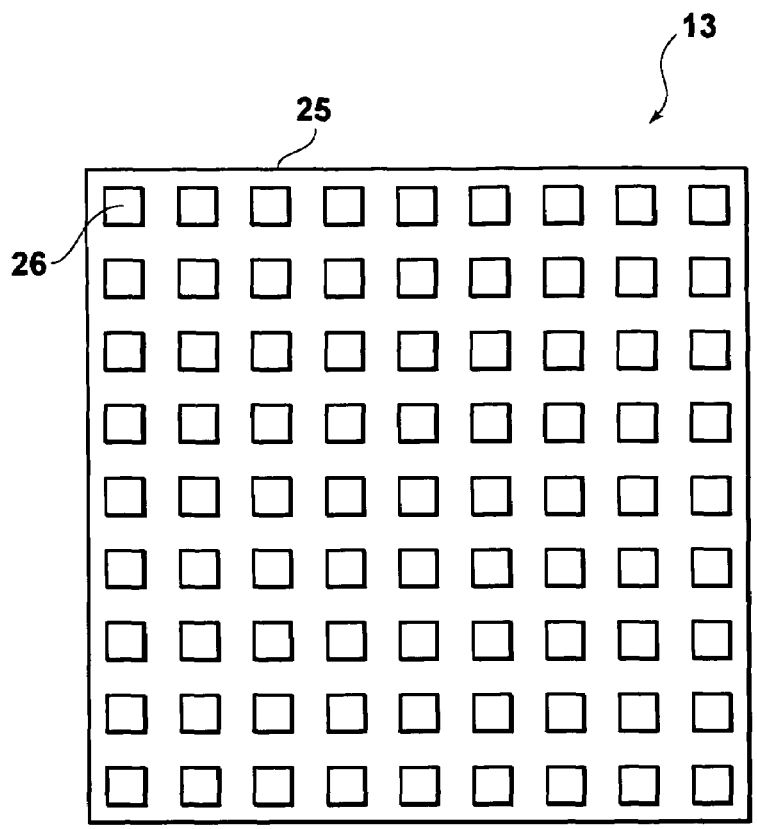
FIG. 2 is a schematic plan view of a CCD image-pickup device used in the electronic color camera of FIG. 1.

As schematically illustrated in FIG. 2, a great number of photoelectric conversion elements 26 are arranged in a matrix over a light-reception area 25 in the CCD image-pickup device 13. Light injected into the photoelectric conversion elements 26 is photoelectrically converted into R, G, and B picture signals, which are then outputted from the CCD image-pickup device 13 through the A/D converter 14 to the signal processing unit 15. In addition, the on-chip type RGB filter 27 is arranged over the light-reception area 25.

Figure 3:
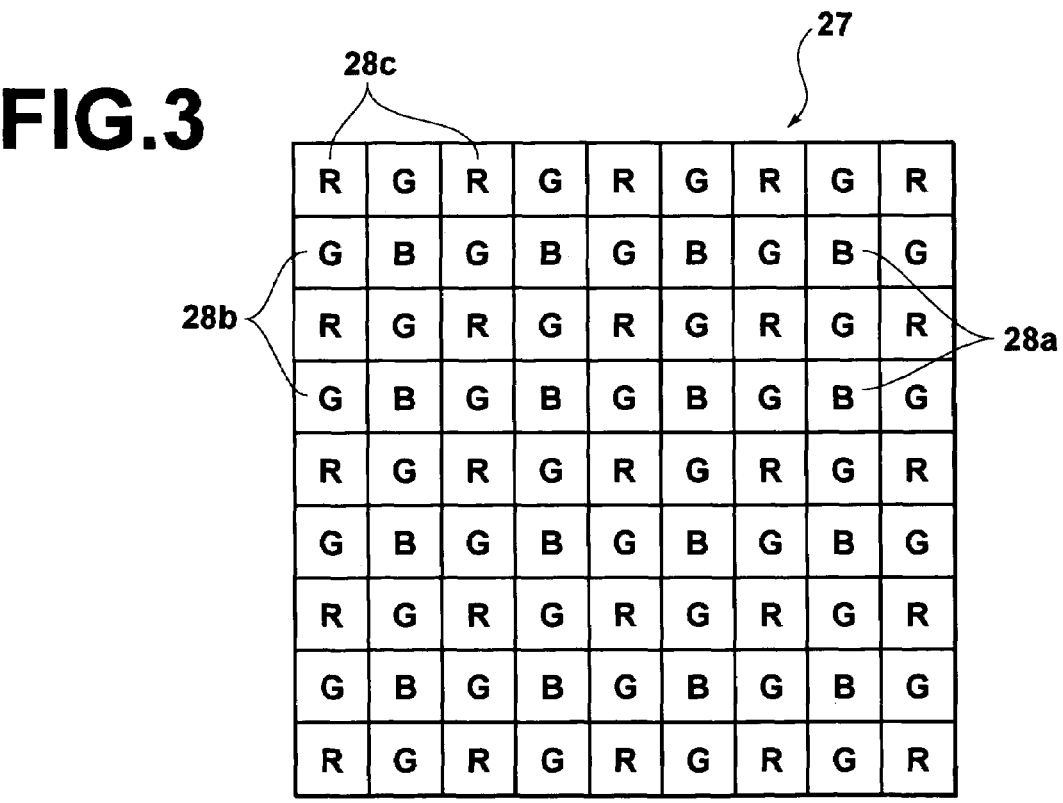
FIG. 3 is a schematic plan view of an RGB filter used in the electronic color camera of FIG. 1.

As schematically illustrated in FIG. 3, B filters 28a, G filters 28b, and R filters 28c are alternately arranged in the RGB filter 27. The B filters 28a transmit light in the wavelength range of about 400 to 450 nm, the G filters 28b transmit light in the wavelength range of about 500 to 550 nm, and the R filters 28c transmit light having wavelengths equal to or greater than 600 nm. Thus, the B filters 28a, the G filters 28b, the R filters 28c, and the glass cover 12 on which the dielectric multilayer film 11 is formed by vapor deposition constitute the aforementioned color filter unit in the color-image pickup device according to the first aspect of the present invention.

Figure 12:
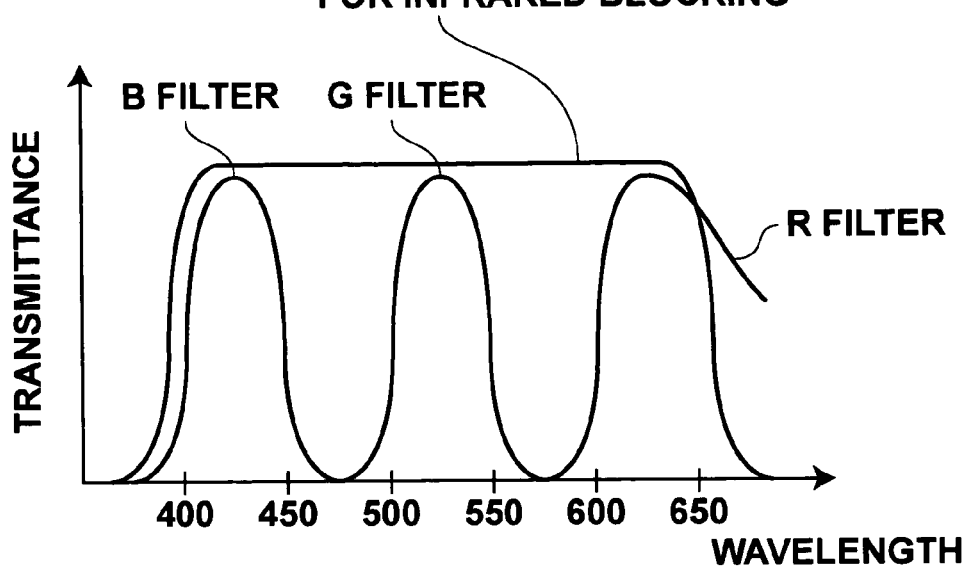
FIG. 12 is a graph indicating the transmission wavelength ranges of the R, G, and B signals in the conventional primary-color filter.

As illustrated in FIG. 12, signal values corresponding to light in the wavelength range from about 400 to 450 nm which has passed through B filters 28a are outputted in the form of a B picture signal, signal values corresponding to light in the wavelength range from about 500 to 550 nm which has passed through G filters 28b are outputted in the form of a G picture signal, and signal values corresponding to light which has passed through R filters 28c are outputted in the form of an R picture signal in the CCD image-pickup device 13. The lower limit of the wavelength range corresponding to the R picture signal is determined to be 600 nm by the R filters 28c, and the upper limit of the wavelength range corresponding to the R picture signal is determined by the upper wavelength limit of the dielectric multilayer film 11.

The transmittances of the R, G, and B filters are arranged so that the signal values of the R, G, and B picture signals at the center of the light-reception area 25 become identical when white light is incident on the CCD image-pickup device 13. In addition, the transmittances of all of the G and B filters arranged over the entire light-reception area 25 are identical.

Figure 4:
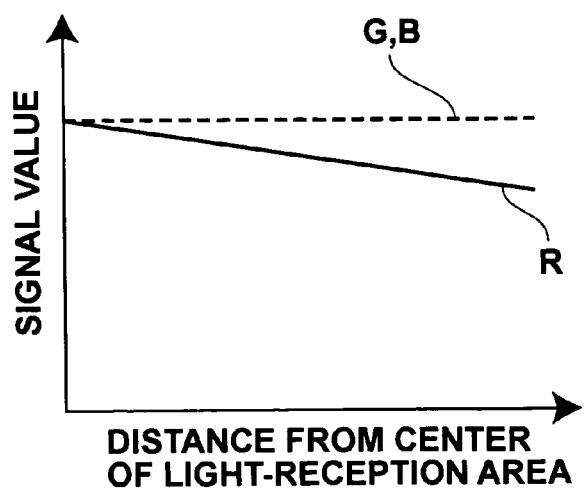
FIG. 4 is a graph indicating relationships between values of R, G, and B picture signals and the distance from the center of the light-reception area of a CCD image-pickup device in the case where all of R, G, and B filters in the CCD image-pickup device have an identical transmittance in an entire light-reception area.

On the other hand, as described above, the transmission wavelength range of the dielectric multilayer film 11 for infrared blocking moves to the shorter-wavelength side when the incident angle on the dielectric multilayer film 11 increases. That is, the transmission wavelength range of the dielectric multilayer film 11 is shifted to the shorter wavelength side by a greater amount at each photoelectric conversion element located farther from the center of the light-reception area, i.e., at each photoelectric conversion element corresponding to a greater image height. Therefore, the width of the wavelength range for the R picture signal is smaller at each photoelectric conversion element located farther from the center of the light-reception area 25. Thus, if all of the R filters 28c arranged over the light-reception area 25 have an identical transmittance, the signal value obtained from each of the photoelectric conversion elements 26 decreases with an increase in the distance from the center of the light-reception area to the photoelectric conversion element, as indicated in FIG. 4. To simplify the description, hereinafter, the values of the R, G, and B picture signals are evaluated based on the assumption that white light is incident on the CCD image-pickup device 13.

Figure 5A:
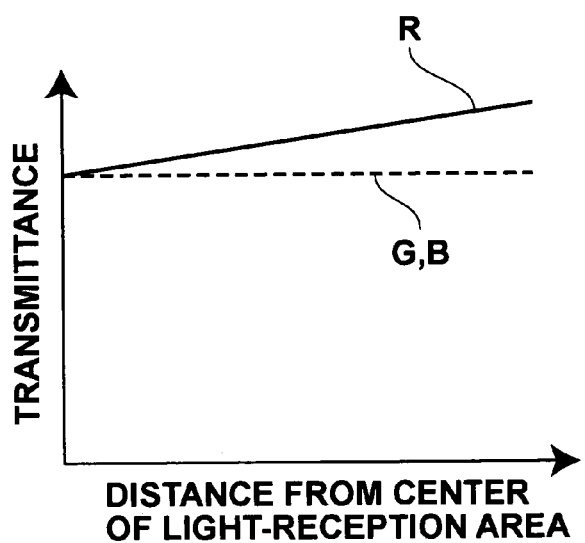
FIG. 5A is a graph indicating relationships between transmittances of R, G, and B filters and the distance from the center of the light-reception area of the CCD image-pickup device used in the electronic color camera of FIG. 1.
Figure 5B:
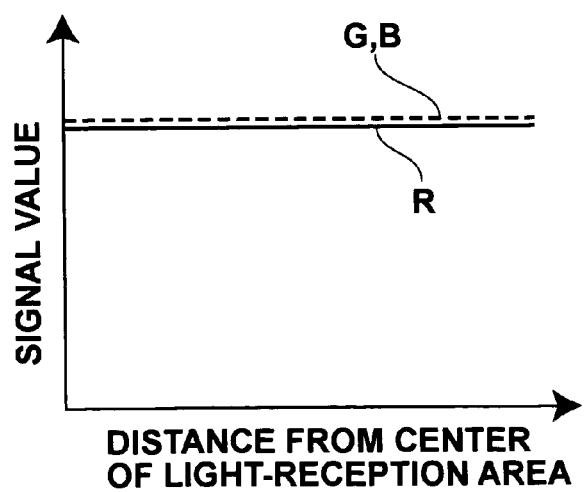
FIG. 5B is a graph indicating relationships between values of the R, G, and B picture signals and the distance from the center of the light-reception area of the CCD image-pickup device used in the electronic color camera of FIG. 1.

According to the first embodiment, the decrease in the values of the R picture signal caused by the decrease in the width of the wavelength range corresponding to the R picture signal is compensated for by increasing the transmittance of each of the R filters 28c with an increase in the distance from the center of the light-reception area 25, as illustrated in FIG. 5A. Consequently, the intensities of the R, G, and B picture signals outputted from the CCD image-pickup device 13 become approximately uniform in the entire light-reception area 25, as illustrated in FIG. 5B, when the entire light-reception area 25 receives uniform white light. The function of the aforementioned transmittance distribution means in the CCD image-pickup device according to the first aspect of the present invention is realized by the R filters 28c.

The R, G, and B picture signals outputted from the CCD image-pickup device 13 are digitized by the A/D converter 14, and the digitized R, G, and B picture signals are processed by the signal processing unit 15 in a predetermined manner so that a color image signal corresponding to the R, G, and B picture signals is generated and supplied to the display unit 16. In addition, the color image signal is further processed by the signal processing unit 15 for image compression or the like, and recorded in the recording unit 17. Further, in the case where the light-reception efficiency decreases and shading occurs in vicinities of the perimeter of the light-reception area 25, it is possible to perform correction processing in the signal processing unit 15.

As described above, since the transmittance of the R filter 28c corresponding to each of the photoelectric conversion elements 26 is increased with the distance from the center of the light-reception area 25 to the photoelectric conversion element, the decrease in the values of the R picture signal caused by the reduction in the width of the wavelength range corresponding to the R picture signal is compensated for. Therefore, when the entire light-reception area 25 receives light having a uniform color, the ratio between the intensities of the R picture signal and each of the B and G picture signals becomes approximately uniform in the entire light-reception area 25, and thus it is possible to prevent occurrence of color shading. In addition, since there is no difference in the intensity of each of the R, G, and B picture signals between the center and the vicinities of the perimeter of the light-reception area 25, it is possible to suppress occurrence of luminance shading.

Further, since, according to the first embodiment, the R filters 28c have the function of the aforementioned transmittance distribution means, it is unnecessary to provide a separate component to realize the function of the transmittance distribution means. Therefore, it is possible to prevent an increase in the device size.

The first embodiment of the present invention can be modified as follows.

(i) Alternatively, the transmittance distribution means can be realized in the following manners.

According to a first alternative to the first embodiment, it is possible to provide a filter separately from the RGB filter 27, where the transmittance of light in the wavelength range corresponding to the R picture signal through the filter is increased with the distance from the center of the light-reception area.

In the case where microlenses for forming images on the respective photoelectric conversion elements 26 are mounted in the CCD image-pickup device 13, according to a second alternative to the first embodiment, it is possible to make the respective microlenses have different transmittances so that the microlenses realize the transmittance distribution means.

According to a third alternative to the first embodiment, it is possible to provide a flattened film between the photoelectric conversion elements 26 and the RGB filter 27 so that the transmittance of light in the wavelength range corresponding to the R picture signal through the flattened film is increased with the distance from the center of the light-reception area.

(ii) Instead of increasing the transmittance of each of the R filters 28c with the distance from the center of the light-reception area 25 to the corresponding photoelectric conversion element, it is possible to decrease the transmittance of each of the B filters 28a and the G filters 28b with an increase in the distance from the center of the light-reception area 25 to the corresponding photoelectric conversion element. In this case, it is also possible to prevent the occurrence of color shading.

(iii) Although the RGB filter is used in the first embodiment, the RGB filter may be replaced with a YCyMg filter constituted by Y, Cy, and Mg filters. In this case, it is possible to achieve the advantages of the first embodiment by arranging the transmittances of the Y filters and the Mg filters so that the substantial transmittance of a red wavelength range increases with the distance from the center of the light-reception area 25. Alternatively, it is possible to arrange the transmittances of the Cy filters so that the substantial transmittance of each of the green and blue wavelength ranges decreases with an increase in the distance from the center of the light-reception area 25.

Second Embodiment

FIG. 6 is a diagram schematically illustrating an outline of a construction of an electronic color camera according to the second embodiment of the present invention. In FIG. 6, elements which are equivalent to corresponding elements in FIG. 1 bear the same references as the corresponding elements in FIG. 1, and descriptions of the equivalent elements are omitted.

The electronic color camera of FIG. 6 comprises an image-forming optical system 10, a glass cover 12 on which a dielectric multilayer film 11 for infrared blocking is formed by vapor deposition, a CCD image-pickup device 13 to which an on-chip type RGB filter 30 is attached, an amplifier 32 which amplifies a picture signal outputted from the CCD image-pickup device 13 for each color, an analog-to-digital (A/D) converter 14 which performs analog-to-digital conversion of picture signals outputted from the amplifier 32, a signal processing unit 15 which processes picture signals digitized by the A/D converter 14, a display unit 16 which displays picture signals processed by the signal processing unit 15 in a predetermined manner, and a recording unit 17 which records picture signals processed by the signal processing unit 15 for image compression or the like.

In the RGB filter 30, B filters 31a, G filters 31b, and R filters 31c are alternately arranged. The B filters 31a transmit light in the wavelength range of about 400 to 450 nm, the G filters 31b transmit light in the wavelength range of about 500 to 550 nm, and the R filters 31c transmit light having wavelengths equal to or greater than 600 nm. Thus, the B filters 31a, the G filters 31b, the R filters 31c, and the glass cover 12, on which the dielectric multilayer film 11 is formed by vapor deposition, constitute the aforementioned color filter unit in the CCD image-pickup device according to the second aspect of the present invention.

Figure 7A:
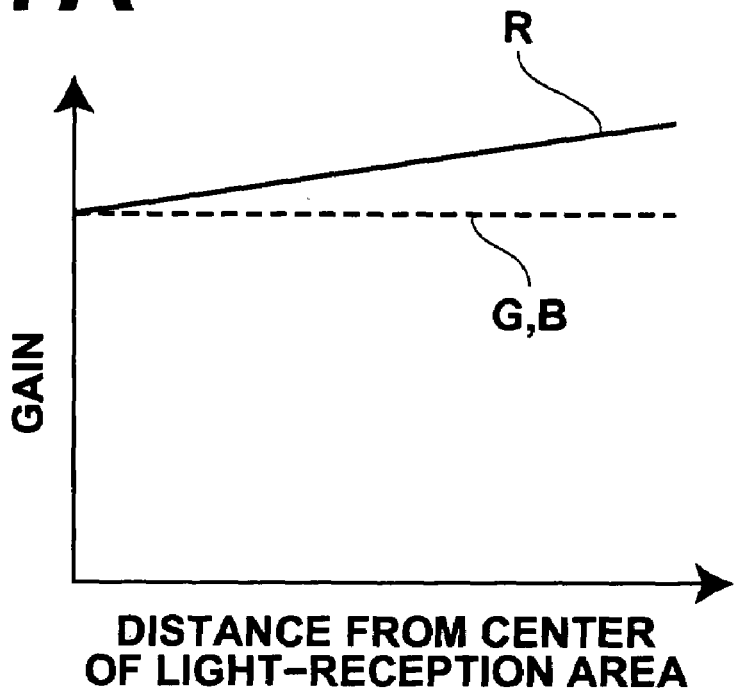
FIG. 7A is a graph indicating relationships between gains of R, G, and B picture signals and the distance from the center of the light-reception area of the CCD image-pickup device used in the electronic color camera of FIG. 6 in the case where the CCD image-pickup device has a first light-reception-efficiency characteristic.

The amplifier 32 acquires R, G, and B picture signals and information on the distance from the center of the light-reception area 25 corresponding to the R, G, and B picture signals, and increases the gain of the R picture signal according to the distance from the center of the light-reception area 25 as illustrated in FIG. 7A.

In the CCD image-pickup device 13, signal values corresponding to light in the wavelength range from about 400 to 450 nm which has passed through B filters 31a are outputted in the form of a B picture signal, signal values corresponding to light in the wavelength range from about 500 to 550 nm which has passed through G filters 31b are outputted in the form of a G picture signal, and signal values corresponding to light which has passed through R filters 31c are outputted in the form of an R picture signal. The lower limit of the wavelength range corresponding to the R picture signal is determined to be 600 nm by the R filters 31c, and the upper limit of the wavelength range corresponding to the R picture signal is determined by the upper wavelength limit of the dielectric multilayer film 11.

The transmittances of the R, G, and B filters are arranged so that the signal values of the R, G, and B picture signals at the center of the light-reception area 25 become identical when white light is incident on the CCD image-pickup device 13. In addition, the transmittances of all of the R, G, and B filters arranged over the light-reception area 25 are identical.

On the other hand, as described above, the upper limit of the transmission wavelength range of the dielectric multilayer film 11 for infrared blocking decreases when the incident angle on the dielectric multilayer film 11 increases. That is, the upper limit of the transmission wavelength range of the dielectric multilayer film 11 is smaller at each photoelectric conversion element located farther from the center of the light-reception area, i.e., at each photoelectric conversion element corresponding to a greater image height. Therefore, the width of the wavelength range for the R picture signal is smaller at each photoelectric conversion element located farther from the center of the light-reception area. Since all of the R filters 31c arranged over the light-reception area 25 have an identical transmittance according to the second embodiment, the signal value obtained from each of the photoelectric conversion elements 26 decreases with an increase in the distance from the center of the light-reception area to the photoelectric conversion element, as indicated in FIG. 4.

Figure 7B:
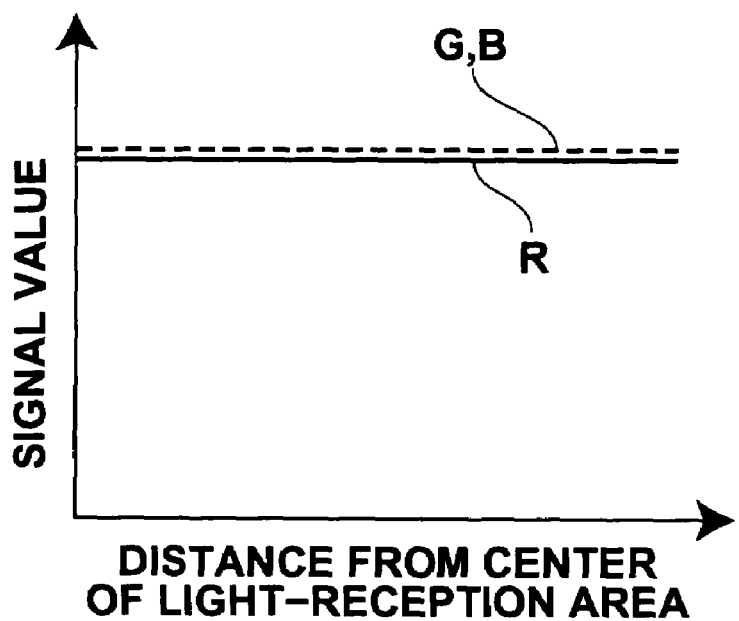
FIG. 7B is a graph indicating relationships between amplified values of the R, G, and B picture signals and the distance from the center of the light-reception area of the CCD image-pickup device used in the electronic color camera of FIG. 6 in the case where the CCD image-pickup device has the first light-reception-efficiency characteristic.

According to the second embodiment, the decrease in the values of the R picture signal caused by the decrease in the width of the wavelength range corresponding to the R picture signal is compensated for by increasing the gain of the R picture signal with an increase in the distance from the center of the light-reception area 25 as illustrated in FIG. 7A. Consequently, the values of the R, G, and B picture signals outputted from the amplifier 32 become approximately uniform in the entire light-reception area 25 as illustrated in FIG. 7B when the entire light-reception area receives uniform white light.

The R, G, and B picture signals outputted from the amplifier 32 are digitized by the A/D converter 14, and the digitized R, G, and B picture signals are processed by the signal processing unit 15 in a predetermined manner so that a color image signal corresponding to the R, G, and B picture signals is generated and supplied to the display unit 16. In addition, the color image signal is further processed by the signal processing unit 15 for image compression or the like, and recorded in the recording unit 17.

Figure 8A:
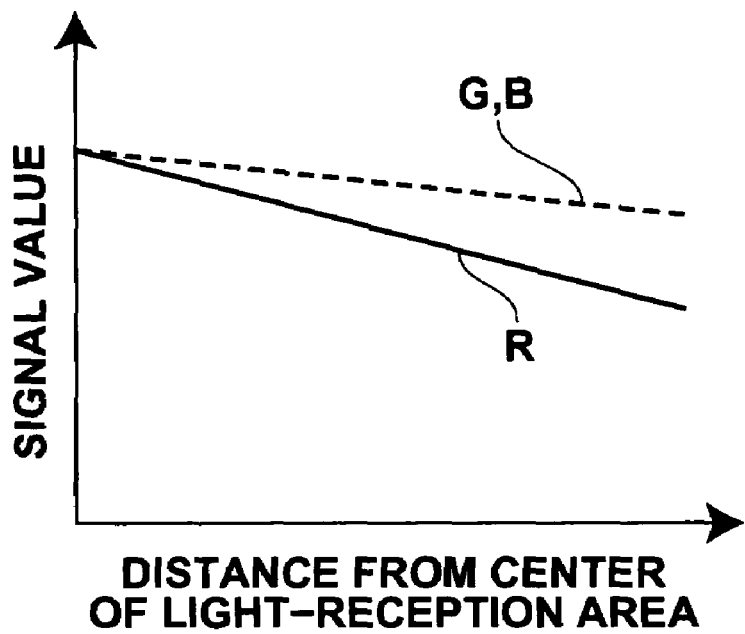
FIG. 8A is a graph indicating second relationships between gains of R, G, and B picture signals and the distance from the center of the light-reception area of the CCD image-pickup device used in the electronic color camera of FIG. 6 in the case where the CCD image-pickup device has a second light-reception-efficiency characteristic.
Figure 8B:
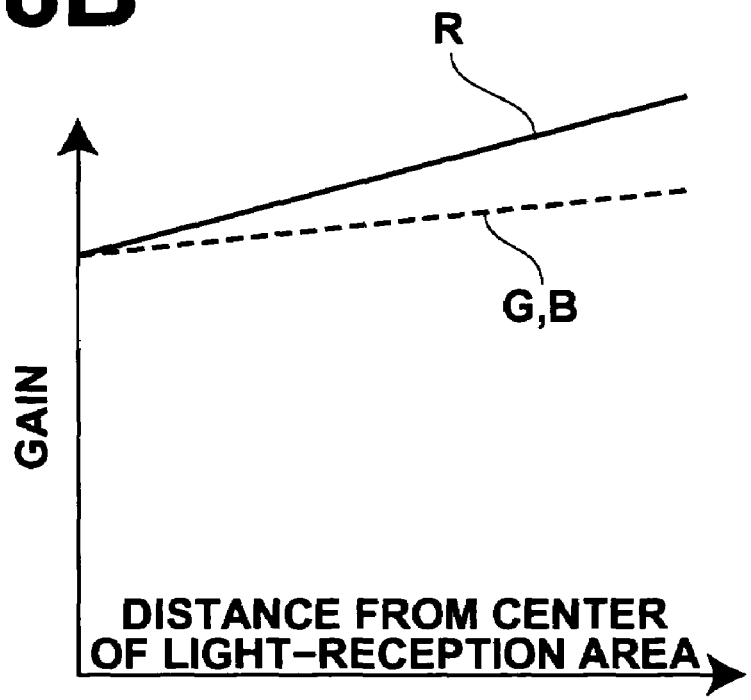
FIG. 8B is a graph indicating second relationships between amplified values of the R, G, and B picture signals and the distance from the center of the light-reception area of the CCD image-pickup device used in the electronic color camera of FIG. 6 in the case where the CCD image-pickup device has the second light-reception-efficiency characteristic.

Further, when the light-reception efficiency decreases and shading occurs in vicinities of the perimeter of the light-reception area 25, the signal values of the R, G, and B picture signals decrease as illustrated in FIG. 8A. In this case, it is possible to perform correction processing in the signal processing unit 15. Alternatively, it is possible to set the gain in the amplifier 32 in advance so as to compensate for the shading as illustrated in FIG. 8B.

As described above, since the gain of the R picture signal corresponding to each of the photoelectric conversion elements 26 is increased with the distance from the center of the light-reception area 25 to the photoelectric conversion element, the decrease in the values of the R picture signal caused by the reduction in the width of the wavelength range corresponding to the R picture signal is compensated for. Therefore, when the entire light-reception area 25 receives light having a uniform color, the ratio between the intensities of the R picture signal and each of the B and G picture signals becomes approximately uniform in the entire light-reception area 25, and thus it is possible to prevent the occurrence of color shading.

Instead of increasing the gain of the R picture signal with the distance from the center of the light-reception area 25 to the corresponding photoelectric conversion element, it is possible to decrease the gains of the G and B picture signals with an increase in the distance from the center of the light-reception area 25 to the corresponding photoelectric conversion element. In this case, it is also possible to prevent occurrence of color shading.

Although the RGB filter is used in the second embodiment, the RGB filter may be replaced with a YCyMg filter constituted by Y, Cy, and Mg filters. In this case, it is possible to achieve the advantages of the second embodiment by arranging the gain of a Cy picture signal corresponding to each of the photoelectric conversion elements 26 to decrease with an increase in the distance from the center of the light-reception area 25 to the photoelectric conversion element.

Third Embodiment

Figure 9:
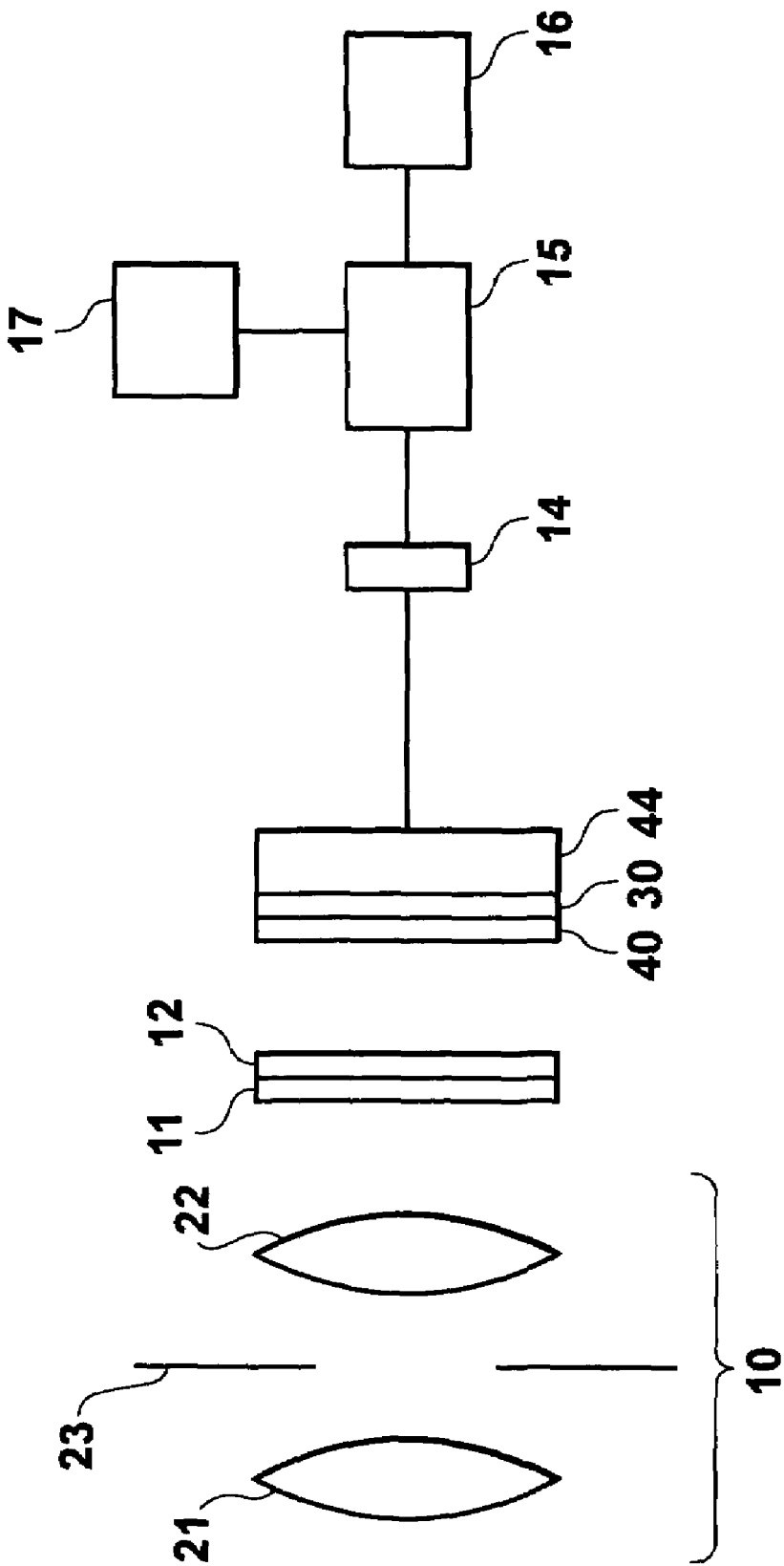
FIG. 9 is a diagram schematically illustrating an outline of a construction of an electronic color camera according to a third embodiment of the present invention.

FIG. 9 is a diagram schematically illustrating an outline of a construction of an electronic color camera according to the third embodiment of the present invention. In FIG. 9, elements which are equivalent to corresponding elements in FIG. 1 bear the same references as the corresponding elements in FIG. 1, and the explanations on the equivalent elements are not repeated here.

The electronic color camera of FIG. 9 comprises an image-forming optical system 10, a glass cover 12 on which a dielectric multilayer film 11 for infrared blocking is formed by vapor deposition, a CCD image-pickup device 44 to which an on-chip type microlens array 40 and an on-chip type RGB filter 30 are attached, an analog-to-digital (A/D) converter 14 which performs analog-to-digital conversion of picture signals outputted from the CCD image-pickup device 44, a signal processing unit 15 which processes picture signals digitized by the A/D converter 14, a display unit 16 which displays picture signals processed by the signal processing unit 15 in a predetermined manner, and a recording unit 17 which records picture signals processed by the signal processing unit 15 for image compression or the like.

A great number of photoelectric conversion elements 46 are arranged in a matrix over a light-reception area 45 in the CCD image-pickup device 44. Light injected into the photoelectric conversion elements 46 is photoelectrically converted into R, G, and B picture signals, which are then outputted from the CCD image-pickup device 44 through the A/D converter 14 to the signal processing unit 15. In addition, the microlens array 40 is constituted by a great number of microlenses 41 which are arranged in a matrix and a one-to-one correspondence with the photoelectric conversion elements 46.

The incident angle on the photoelectric conversion elements 46 is greater at each photoelectric conversion element located farther from the center of the light-reception area 45, i.e., at each photoelectric conversion element corresponding to a greater image height. Therefore, if all of the microlenses 41 are aligned with the centers of the corresponding photoelectric conversion elements 46, respectively, the position at which light having passed through each of the microlenses 41 converge deviates from the center of one of the photoelectric conversion elements 46 corresponding to the microlens by a greater amount, and the amount of decrease in the light-reception efficiency is greater, when the corresponding one of the photoelectric conversion elements 46 is located farther from the center of the light-reception area 45.

Figure 10:
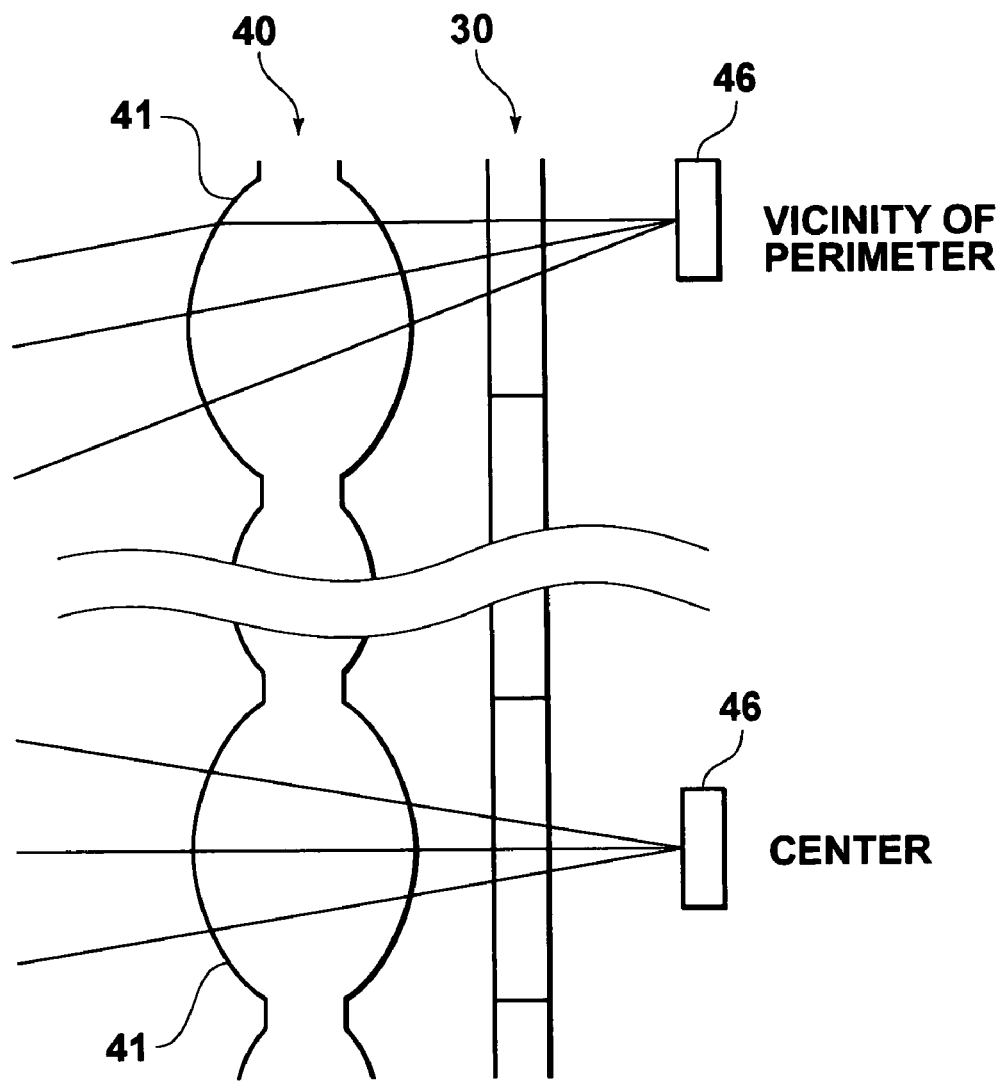
FIG. 10 is a diagram schematically illustrating relative positions of microlenses and photoelectric conversion elements in a CCD image-pickup device used in the electronic color camera of FIG. 9.

In order to prevent the above decrease in the light-reception efficiency, according to the third embodiment, the relative position of each of the photoelectric conversion elements 46 with respect to one of the microlenses 41 corresponding to the photoelectric conversion element is adjusted in correspondence with the incident angle on the photoelectric conversion element, as schematically illustrated in FIG. 10. In addition, each of the R, G, and B filters is appropriately positioned.

As described previously, the upper limit of the transmission wavelength range of the dielectric multilayer film 11 for infrared blocking decreases when the incident angle on the dielectric multilayer film 11 increases. That is, the upper limit of the transmission wavelength range of the dielectric multilayer film 11 is smaller at each photoelectric conversion element located farther from the center of the light-reception area, i.e., at each photoelectric conversion element corresponding to a greater image height. Therefore, the width of the wavelength range for the R picture signal is smaller at each photoelectric conversion element located farther from the center of the light-reception area. Thus, even when the relative position of each of the photoelectric conversion elements 46 with respect to one of the microlenses 41 corresponding to the photoelectric conversion element is adjusted in correspondence with the incident angle on the photoelectric conversion element so as to maximize the light-reception efficiency, the value of the R picture signal decreases with an increase in the distance from the center of the light-reception area 45 to the photoelectric conversion element, as illustrated in FIG. 4.

Figure 11A:
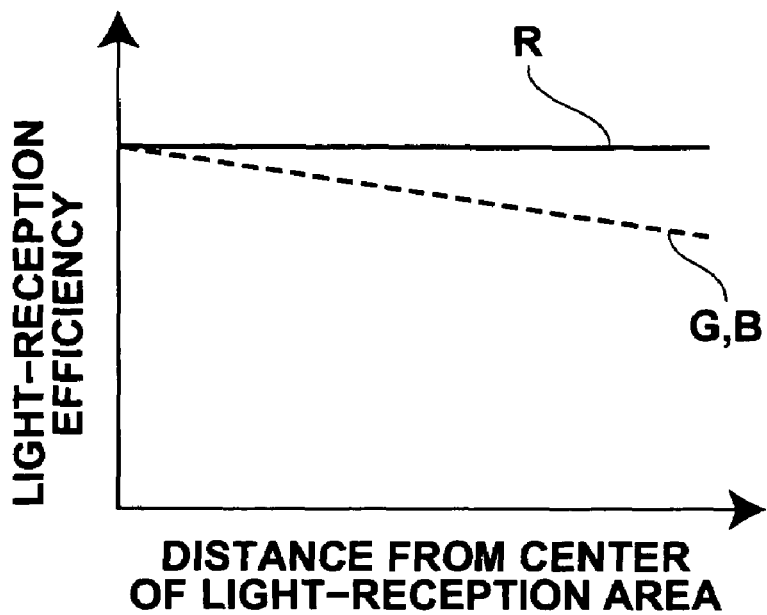
FIG. 11A is a graph indicating relationships between light-reception efficiencies of R, G, and B picture signals and the distance from the center of the light-reception area of the CCD image-pickup device used in the electronic color camera of FIG. 9.
Figure 11B:
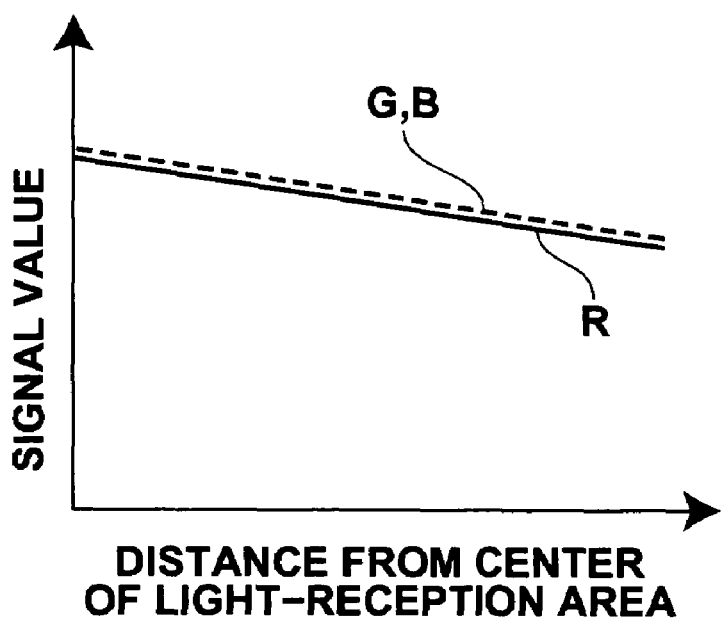
FIG. 11B is a graph indicating relationships between values of the R, G, and B picture signals and the distance from the center of the light-reception area of the CCD image-pickup device used in the electronic color camera of FIG. 10.

In consideration of the above problem, according to the third embodiment, the position of each of the photoelectric conversion elements 46 corresponding to the G filters 31$b$ and the B filters 31$c$ is shifted from the position that maximizes the light-reception efficiency, based on the distance from the center of the light-reception area 45 to the photoelectric conversion element, so that the light-reception efficiency at each of the photoelectric conversion elements 46 corresponding to the G filters 31$b$ and the B filters 31$c$ decreases with an increase in the distance from the center of the light-reception area 45 to the photoelectric conversion element as illustrated in FIG. 11A. Thus, it is possible to decrease the values of the G and B picture signals with an increase in the distance from the center of the light-reception area 45, by approximately the same amount as the decrease in the R picture signal, as illustrated in FIG. 11B.

Although each of the photoelectric conversion elements 46 can be shifted to any direction as long as the light-reception efficiency is decreased by the shift, it is preferable to determine the position of each of the photoelectric conversion elements 46 in consideration of the fact that the position that maximizes the light-reception efficiency is affected by chromatic aberration in the magnification power, coma aberration, and the like of the microlenses 41.

The R, G, and B picture signals outputted from the CCD image-pickup device 44 are digitized by the A/D converter 14, and the digitized R, G, and B picture signals are processed by the signal processing unit 15 in a predetermined manner so that a color image signal corresponding to the R, G, and B picture signals is generated and supplied to the display unit 16. In addition, the color image signal is further processed by the signal processing unit 15 for image compression or the like, and recorded in the recording unit 17.

Further, since the light-reception efficiency decreases and shading occurs in vicinities of the perimeter of the light-reception area 45, it is preferable to perform correction processing in the signal processing unit 15.

As described above, according to the third embodiment, the position of each of the photoelectric conversion elements 46 corresponding to the G filters 31b and the B filters 31c is adjusted so that the values of the G and B picture signals decrease in correspondence with the decrease in the value of the R picture signal. Therefore, when the entire light-reception area 45 receives light having a uniform color, the ratio between the intensities of the R picture signal and each of the B and G picture signals becomes approximately uniform in the entire light-reception area 45, and thus it is possible to prevent occurrence of color shading.

The third embodiment of the present invention can be modified as follows.

(i) Instead of decreasing the light-reception efficiency of each of the photoelectric conversion elements 46 corresponding to the G and B picture signals with an increase in the distance from the center of the light-reception area 45 to the photoelectric conversion element by adjusting the position of the photoelectric conversion element, it is possible to increase the light-reception efficiency of each of the photoelectric conversion elements 46 corresponding to the R picture signal with an increase in the distance from the center of the light-reception area 45 to the photoelectric conversion element. In this case, it is also possible to prevent occurrence of color shading.

(ii) Instead of shifting the positions of the photoelectric conversion elements 46, it is possible to shift the microlenses 41. In this case, it is also possible to achieve the advantages of the third embodiment.

(iii) Although the RGB filter is used in the third embodiment, the RGB filter may be replaced with a YCyMg filter constituted by Y, Cy, and Mg filters. In this case, it is possible to achieve the advantages of the third embodiment by decreasing the light-reception efficiency at each of the photoelectric conversion elements corresponding to Cy filters with an increase in the distance from the center of the light-reception area 45 to the photoelectric conversion element.

Additional Matters (i) In the first through third embodiments, the glass cover 12, on which the dielectric multilayer film 11 for infrared blocking is formed, is used as the aforementioned optical element having a dielectric multilayer film for infrared blocking in the first through third aspects of the present invention. However, the optical element having a dielectric multilayer film is not limited to the glass cover 12. For example, it is possible to use a lens or a filter on which a dielectric multilayer film for infrared blocking is formed by vapor deposition.

(ii) It is preferable that the maximum incident angle of light on the dielectric multilayer film for infrared blocking is 30 degrees or smaller.

(iii) In the case where the dielectric multilayer film for infrared blocking is formed on a curved surface by vapor deposition, it is preferable to adjust the ratio between the intensities of the R picture signal and each of the B and G picture signals according to the incident angle on the curved surface.

(iv) In addition, all of the contents of the Japanese patent application No. 2003-082848 are incorporated into this specification by reference.

What is claimed is:

1. A color-image pickup device comprising:
a color filter unit which includes R filters, G filters, B filters, and an optical element having a dielectric multilayer film for infrared blocking, for decomposing light into a first component in a red wavelength range, a second component in a green wavelength range, and a third component in a blue wavelength range, wherein the R filters determine a lower wavelength limit of the red wavelength range, the G filters determine the green wavelength range, the B filters determine the blue wavelength range, and the dielectric multilayer film determines an upper wavelength limit of the red wavelength range;
an image pickup unit which is placed in a stage following said color filter unit, includes a plurality of photoelectric conversion elements being arranged in a light-reception area to receive said first, second, and third components, picks up an optical image from the first, second, and third components received by the plurality of photoelectric conversion elements, and outputs picture signals corresponding to the first, second, and third components;
a color-picture-signal generation unit which generates a color-picture signal based on said picture signal outputted from said image pickup unit; and
a transmittance distribution means for realizing a spatial distribution of a ratio of a transmittance of said first component received by ones of said plurality of photoelectric conversion elements arranged in each portion of said light-reception area to a transmittance of each of the second and third components received by ones of the plurality of photoelectric conversion elements arranged in each said portion of the light-reception area, so that the ratio increases with a distance from a center of said light-reception area to each said portion of the light-reception area.

2. A color-image pickup device according to claim 1, wherein said ratio is increased by increasing the transmittance of the first component received by each said of the plurality of photoelectric conversion elements with the distance from the center of said light reception area to each said portion of the light reception area.

3. A color-image pickup device according to claim 1, wherein each of said R filters has a transmittance which increases with a distance from said center of the light-reception area to each of said R filters so that the R filters realize the transmittance distribution means.

4. A color-image pickup device according to claim 2, wherein each of said R filters has a transmittance which increases with a distance from said center of the light-reception area to each of said R filters so that the R filters realize the transmittance distribution means.

5. A color-image pickup device according to claim 1, wherein the ratio is increased by decreasing the transmittance of the second and third components received by each said of the plurality of photoelectric conversion elements with the distance from the center of said light reception area to each said portion of the light reception area.

6. A color-image pickup device according to claim 1, wherein the ratio is increased in such a manner that relative signal intensity of the first, second and third components become uniform in an entire light-reception area when the entire light reception area receives a light having a uniform color.

7. A color-image pickup device comprising:
a color filter unit which includes R filters, G filters, B filters, and an optical element having a dielectric multilayer film for infrared blocking, for decomposing light into a first component in a red wavelength range, a second component in a green wavelength range, and a third component in a blue wavelength range, wherein the R filters determine a lower wavelength limit of the red wavelength range, the G filters determine the green wavelength range, the B filters determine the blue wavelength range, and the dielectric multilayer film determines an upper wavelength limit of the red wavelength range;
an image pickup unit which is placed in a stage following said color filter unit, includes a plurality of microlenses and a plurality of photoelectric conversion elements being arranged in a light-reception area to receive said first, second, and third components through the plurality of microlenses, picks up an optical image from the first, second, and third components received by the plurality of photoelectric conversion elements, and outputs picture signals corresponding to the first, second, and third components; and
a color-picture-signal generation unit which generates a color-picture signal based on said first, second, and third picture signals outputted from said image pickup unit;
wherein relative positions between each of said plurality of photoelectric conversion elements and one of said plurality of microlenses corresponding to the photoelectric conversion element are set in such a manner that a ratio of light-reception efficiency of the first component received by ones of said plurality of photoelectric conversion elements arranged in each portion of said light-reception area to light-reception efficiency of the second and third components received by ones of the plurality of photoelectric conversion elements arranged in each said portion of the light-reception area increases with a distance from a center of the light-reception area to each said portion of the light-reception area.

8. A color-image pickup device according to claim 7, wherein the ratio is increased in such a manner that relative signal intensity of the first, second and third components become uniform in an entire light-reception area when the entire light reception area receives a light having a uniform color.

9. An electronic color camera comprising:
an image-forming optical system; and
a color-image pickup device optically coupled to said image-forming optical system;
wherein said color-image pickup device includes,
a color filter unit which includes R filters, G filters, B filters, and an optical element having a dielectric multilayer film for infrared blocking, for decomposing light into a first component in a red wavelength range, a second component in a green wavelength range, and a third component in a blue wavelength range, wherein the R filters determine a lower wavelength limit of the red wavelength range, the G filters determine the green wavelength range, the B filters determine the blue wavelength range, and the dielectric multilayer film determines an upper wavelength limit of the red wavelength range,
an image pickup unit which is placed in a stage following said color filter unit, includes a plurality of photoelectric conversion elements being arranged in a light-reception area to receive said first, second, and third components, picks up an optical image from the first, second, and third components received by the plurality of photoelectric conversion elements, and outputs picture signals corresponding to the first, second, and third components,
a color-picture-signal generation unit which generates a color-picture signal based on said picture signal outputted from said image pickup unit, and
a transmittance distribution means for realizing a spatial distribution of a ratio of a transmittance of said first component received by ones of said plurality of photoelectric conversion elements arranged in each portion of said light-reception area to a transmittance of each of the second and third components received by ones of the plurality of photoelectric conversion elements arranged in each said portion of the light-reception area so that the ratio increases with a distance from a center of said light-reception area to each said portion of the light-reception area.

10. A color-image pickup device according to claim 9, wherein the ratio is increased by decreasing the transmittance of the second and third components received by each said of the plurality of photoelectric conversion elements with the distance from the center of said light reception area to each said portion of the light reception area.

11. A color-image pickup device according to claim 9, wherein the ratio is increased in such a manner that relative signal intensity of the first, second and third components become uniform in an entire light-reception area when the entire light reception area receives a light having a uniform color.

12. An electronic color camera comprising:
an image-forming optical system; and
a color-image pickup device optically coupled to said image-forming optical system;
wherein said color-image pickup device includes,
a color filter unit which includes R filters, G filters, B filters, and an optical element having a dielectric multilayer film for infrared blocking, for decomposing light into a first component in a red wavelength range, a second component in a green wavelength range, and a third component in a blue wavelength range, wherein the R filters determine a lower wavelength limit of the red wavelength range, the G filters determine the green wavelength range, the B filters determine the blue wavelength range, and the dielectric multilayer film determines an upper wavelength limit of the red wavelength range,
an image pickup unit which is placed in a stage following said color filter unit, includes a plurality of microlenses and a plurality of photoelectric conversion elements being arranged in a light-reception area to receive said first, second, and third components through the plurality of microlenses, picks up an optical image from the first, second, and third components received by the plurality of photoelectric conversion elements, and outputs picture signals corresponding to the first, second, and third components, and a color-picture-signal generation unit which generates a color-picture signal based on said first, second, and third picture signals outputted from said image pickup unit;

wherein relative positions between each of said plurality of photoelectric conversion elements and one of said plurality of microlenses corresponding to the photoelectric conversion element are set in such a manner that a ratio of light-reception efficiency of the first component received by ones of said plurality of photoelectric conversion elements arranged in each portion of said light-reception area to light-reception efficiency of the second and third components received by ones of the plurality of photoelectric conversion elements arranged in each said portion of the light-reception area increases with a distance from a center of the light-reception area to each said portion of the light-reception area.

13. A color-image pickup device according to claim 12, wherein the ratio is increased in such a manner that relative signal intensity of the first, second and third components become uniform in an entire light-reception area when the entire light reception area receives a light having a uniform color.

* * * * *